J. R. GILCREST.
GEAR WHEEL.
APPLICATION FILED JAN. 21, 1914.

1,219,387.

Patented Mar. 13, 1917.

Witnesses
H. S. McDowell
V. B. Hillyard

Inventor
J. R. Gilcrest,
By Victor J. Evans
Attorney

UNITED STATES PATENT OFFICE.

JESS. R. GILCREST, OF TORONTO, OHIO.

GEAR-WHEEL.

1,219,387.   Specification of Letters Patent.   Patented Mar. 13, 1917.

Application filed January 21, 1914. Serial No. 813,468.

*To all whom it may concern:*

Be it known that I, JESS. R. GILCREST, a citizen of the United States, residing at Toronto, in the county of Jefferson and State of Ohio, have invented new and useful Improvements in Gear-Wheels, of which the following is a specification.

The primary object of the invention is the provision of a gear wheel in which the toothed rim is made detachable so as to be replaced when worn or otherwise unfitted for future effective service.

The invention contemplates a gear wheel embodying a hub and spokes, and a toothed rim detachably connected to the outer ends of the spokes, the hub and spokes being preferably of integral formation and the toothed rim being formed with lugs in position to register with the spokes to which they are fastened preferably by bolts, the openings in the lugs and outer ends of the spokes being formed therein at the time of casting such parts, thereby avoiding the cost of subsequent drilling.

The invention further contemplates a gear wheel having its rim constructed so as to give way when subjected to abnormal or unusual strain, thereby preventing injury to the parts to be driven.

The invention consists of the novel features, details of construction and combination of parts, which hereinafter will be more particularly set forth, illustrated in the accompanying drawing, and pointed out in the appended claim.

Referring to the drawing, forming a part of the specification,

Corresponding and like parts are referred to in the following description, and indicated in all the views of the drawing, by the same reference characters.

Figure 1:
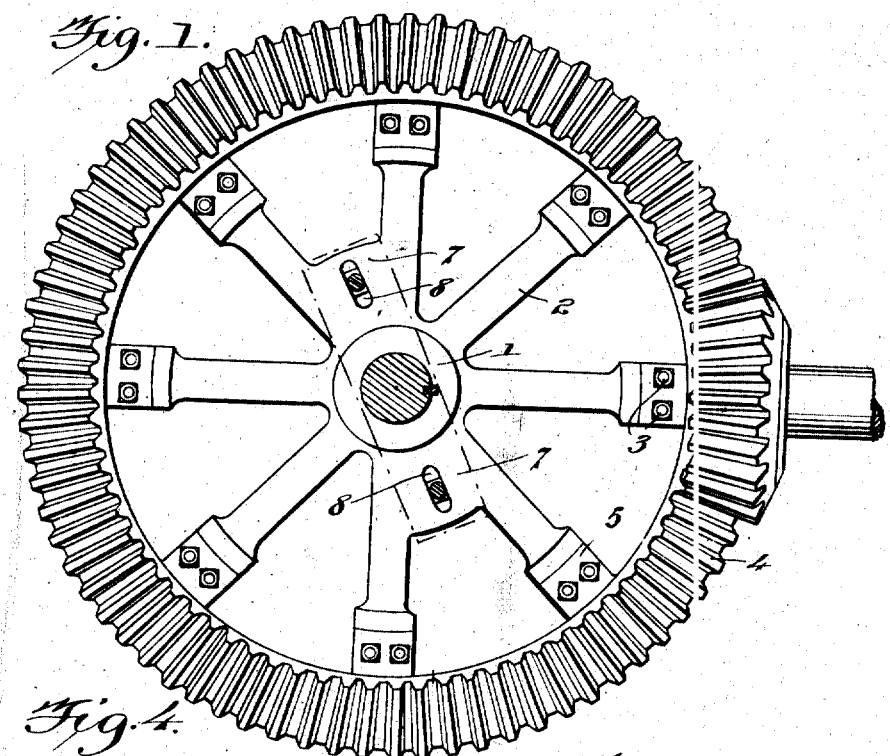
Figure 1 is a front view of a gear wheel embodying the invention.
Figure 4:
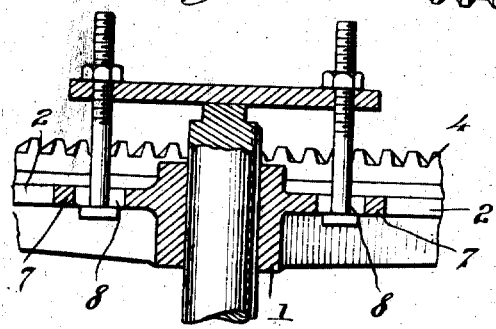
Fig. 4 is a detail view of a portion of the hub and spokes.
Figure 3:
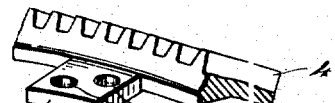
Fig. 3 is a detail view of part of the toothed rim.
Figure 2:
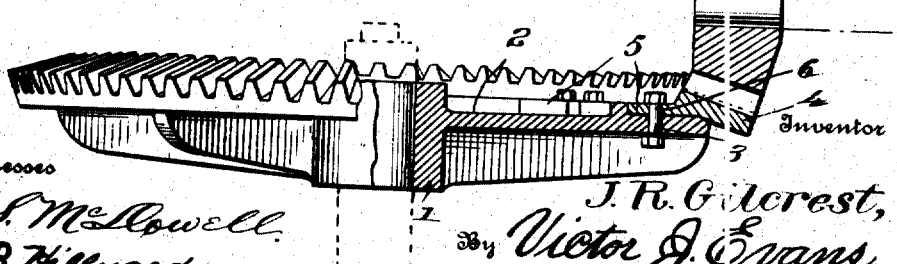
Fig. 2 is an edge view partly in section.

The gear wheel comprises a hub 1 and spokes 2, the latter having their outer ends flattened in the plane of the wheel provided with laterally extending flanges $2^a$ and formed with openings to receive bolts or fastenings 3 by means of which the rim is detachably connected to the outer ends of the spokes. The toothed rim 4 is formed at intervals with lugs 5, which extend inward and are flattened so as to match the flattened outer ends of the spokes, said lugs having openings 6 to register with the openings in the outer ends of the spokes so as to receive the fastenings or bolts 3. The combined strength of the bolts is less than that of the spokes so that the former will be severed upon excessive force being applied to the toothed rim. The construction is such as to admit of the toothed rim being readily replaced when worn or when rendered unfit for further service from any cause.

A web 7 is formed between certain adjacent spokes and has a slot 8 formed therein to receive fastening means when securing the gear wheel to a shaft or other part. This prevents movement of the gear wheel on the shaft and insures companion gears being held in mesh against possible slipping.

From the foregoing description, taken in connection with the accompanying drawing, the advantages of the construction and of the method of operation will be readily apparent to those skilled in the art to which the invention appertains, and while I have described the principle of operation of the invention, together with the device which I now consider to be the best embodiment thereof, I desire to have it understood that the device shown is merely illustrative, and that such changes may be made when desired as are within the scope of the claim appended hereto.

Having thus described the invention what is claimed as new, is:—

In a wheel, in combination, a hub having a series of radial spokes, each of said spokes being formed with a terminal flat portion provided with a right angular integral shoulder upon the latter, an annular rim provided with a circumferentially spaced apart series of integral perforated lugs, said annular rim including a flat annular bottom portion formed flush with all of said lugs, and an annular portion inclined with respect to and formed upon said flat annular portion, said annular rim being formed with a circumferential series of teeth upon its outer side, said teeth being formed across the plane of the flat annular bottom portion and upon the inclined annular portion of said rim, said lugs and the flat annular portion of said annular rim resting upon the spokes with the lugs engaging the shoulders of the latter thereby causing the inclined annular portion of said rim to project beyond the spokes and increasing the diameter of said wheel, and means for holding said rim against displacement.

In testimony whereof I affix my signature in presence of two witnesses.

JESS. R. GILCREST.

Witnesses:
S. B. TAYLOR,
J. W. SHANE.